US006222966B1

(12) United States Patent
Khan et al.

(10) Patent No.: US 6,222,966 B1
(45) Date of Patent: Apr. 24, 2001

(54) ADIABATIC Y-BRANCH WAVEGUIDE HAVING CONTROLLABLE CHIRP

(75) Inventors: Mujibun Nisa Khan, Holmdel; Rene Henri Monnard, Old Bridge, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/222,165

(22) Filed: Dec. 29, 1998

(51) Int. Cl.$^7$ .................................................. G02B 6/26
(52) U.S. Cl. ................................... 385/45; 385/4; 385/43
(58) Field of Search ................................. 385/1–3, 6–8, 385/14–16, 41–45, 22, 5, 31, 40, 131–132

(56) References Cited

U.S. PATENT DOCUMENTS

| | | | |
|---|---|---|---|
| 4,070,092 | * 1/1978 | Burns | 385/45 |
| 5,129,017 | 7/1992 | Kawano et al. | 385/3 |
| 5,408,544 | * 4/1995 | Seino | 385/3 |
| 5,408,566 | 4/1995 | Eda et al. | 385/131 |
| 5,461,684 | * 10/1995 | Vinchant et al. | 385/22 |
| 5,594,818 | 1/1997 | Murphy | 385/8 |
| 5,799,119 | * 8/1998 | Rolland et al. | 385/28 |
| 6,064,787 | * 8/1998 | Castodi | 385/41 |
| 6,064,788 | * 5/2000 | Kham et al. | 385/45 |

OTHER PUBLICATIONS

"Weighted–Coupling Y–Branch Optical Switch in InGaAs/InGaAlAs Quantum Well Electron Transfer Waveguides" IEEE Phot. Tech. Let. vol. No. 3, Mar. 1994 pp. 394–396 by M. N. Kahn et. al.

* cited by examiner

Primary Examiner—Frank G. Font
Assistant Examiner—Sang H. Nguyen
(74) Attorney, Agent, or Firm—John A. Caccuro

(57) ABSTRACT

Changing the index in the two output branches of a Y-branch optical waveguide in opposite directions, in amounts which are controlled by electrical signals applied to the branches, is used to control the chirp of the signal outputted from the Y-branch optical waveguide. In this manner, predetermined amount of chirp can be add to or subtract from an input signal to the Y-branch optical waveguide. The Y-branch optical waveguide can be fabricated using Group II–VI, Group III–V or Group IV material systems or using an insulating material, such as lithium niobate. The output branches of a semiconductor implemented Y-branch optical waveguide can be fabricated to each include a multiple quantum well for controlling the refractive index of that branch in response to an electrical signal.

23 Claims, 4 Drawing Sheets

ADIABATIC Y-BRANCH WAVEGUIDE HAVING CONTROLLABLE CHIRP

CROSS-REFERENCE TO RELATED APPLICATION

Related subject matter is disclosed in the previously filed application entitled "ADIABATIC Y-BRANCH WAVEGUIDE WITH NEGLIGIBLE CHIRP," Ser. No. 08/911,197, filed on Aug. 14, 1997 now U.S. Pat. No. 6,064,788 by the same inventors, N. M. Kahn and R. H. Monnard, and assigned to the same Assignee.

FIELD OF THE INVENTION

The invention relates generally to optical communications and, more particularly, to adiabatic Y-branch waveguides.

BACKGROUND OF THE INVENTION

There is presently a need to provide optical communication paths over relatively long distances on the order of hundreds, or even thousands, of kilometers. Providing such a long-haul communications path often proves challenging. The maximum distance at which optical communications are feasible, and the maximum signal bit rate, are limited by the frequency stability of the semiconductor laser used to generate an optical signal. If the optical signal exhibits frequency chirp, i.e., frequency shifts over time, the signal will be degraded as it traverses the length of a fiber optic cable. These degradations, which include chromatic dispersion and modal dispersion, become more pronounced as the length of cable is increased, and/or as the bit rates are increased, until, at some point, it is no longer possible to recover intelligible information from the optical signal. Therefore, there is a need to minimize frequency chirp in optical communications systems.

In optical communications systems, Y-branched waveguides have been employed to provide digital optical switching and optical signal modulation. A typical Y-branch digital optical switch is designed such that two waveguide branches intersect at a very small angle to form a Y-shaped structure. The composition of the waveguide structure may include any of a wide variety of materials, such as lithium niobate ($LiNbO_3$), and/or various semiconductor materials. One example of a Y-branch digital optical switch is described by M. N. Khan in the 1995 ECOC Proceedings, Vol. 1, pages 103–106. Another Y-branch switch is disclosed in U.S. Pat. No. 5,594,818, entitled, "Digital Optical Switch and Modulator and a Method for Digital Optical Switching and Modulation", issued on Jan. 14, 1997 to Edmond J. Murphy.

Most existing methods of operating optical signal modulators that use the Y-branch configuration change the refractive indices of both output waveguide branches. A modulated signal generated in this manner suffers from frequency chirp. In order to modulate an optical signal, the light propagation direction in one of the waveguide branches is changed by forcing a refractive index change in one of the branches with respect to the other branch. In the aforementioned Murphy patent, this is accomplished by imposing a biasing voltage across the two output waveguide branches. Therefore, the refractive indices in both waveguide branches will change in this instance. In an adiabatic Y-branch modulator, the direction of light propagation follows the waveguide branch having the highest refractive index. Note that, as used herein, the term adiabatic refers to processes involving continuous evolution as opposed to abrupt transitions.

Although many Y-branch modulators induce changes in the refractive indices of both output waveguide branches by applying a voltage to the branches, it should be noted that such changes could also be induced by applying current and/or other external forces to selected sections of both output waveguide branches. However, irrespective of the type of force that is used to induce refractive index changes, all existing proposed methods of controlling Y-branch modulators provide a modulated signal that exhibits frequency chirp.

What would be desirable would be the capability to selectively control the amount of frequency chirp produced by a Y-branch modulator.

SUMMARY OF THE INVENTION

We have found that if the refractive index in the two output branches of a Y-branch optical waveguide is changed in opposite directions, in amounts which are controlled by an electrical signal applied to each of the branches, we can control the chirp of the signal outputted from the Y-branch optical waveguide. In this manner, we can add or subtract a predetermined amount of chirp to the chirp characteristic of the input signal to the Y-branch optical waveguide. Thus, the Y-branch optical waveguide can be used to compensate for or cancel chirp introduced in the optical input signal by prior optical fiber or circuits through which the signal has passed.

More particularly, an adiabatic Y-branch optical waveguide comprises an input branch for receiving an optical signal, a first output branch and a second output branch. A first index changing means changes a refractive index of the first output branch of the waveguide in response to a first electrical signal and a second index changing means changes a refractive index of the second output branch of the waveguide in an opposite direction to the change of refractive index of the first output branch in response to a second electrical signal. The first and second electrical signals are controlled to produce a desired amount of chirp in the optical signal outputted from one of the output branches.

DETAILED DESCRIPTION

Figure 1:
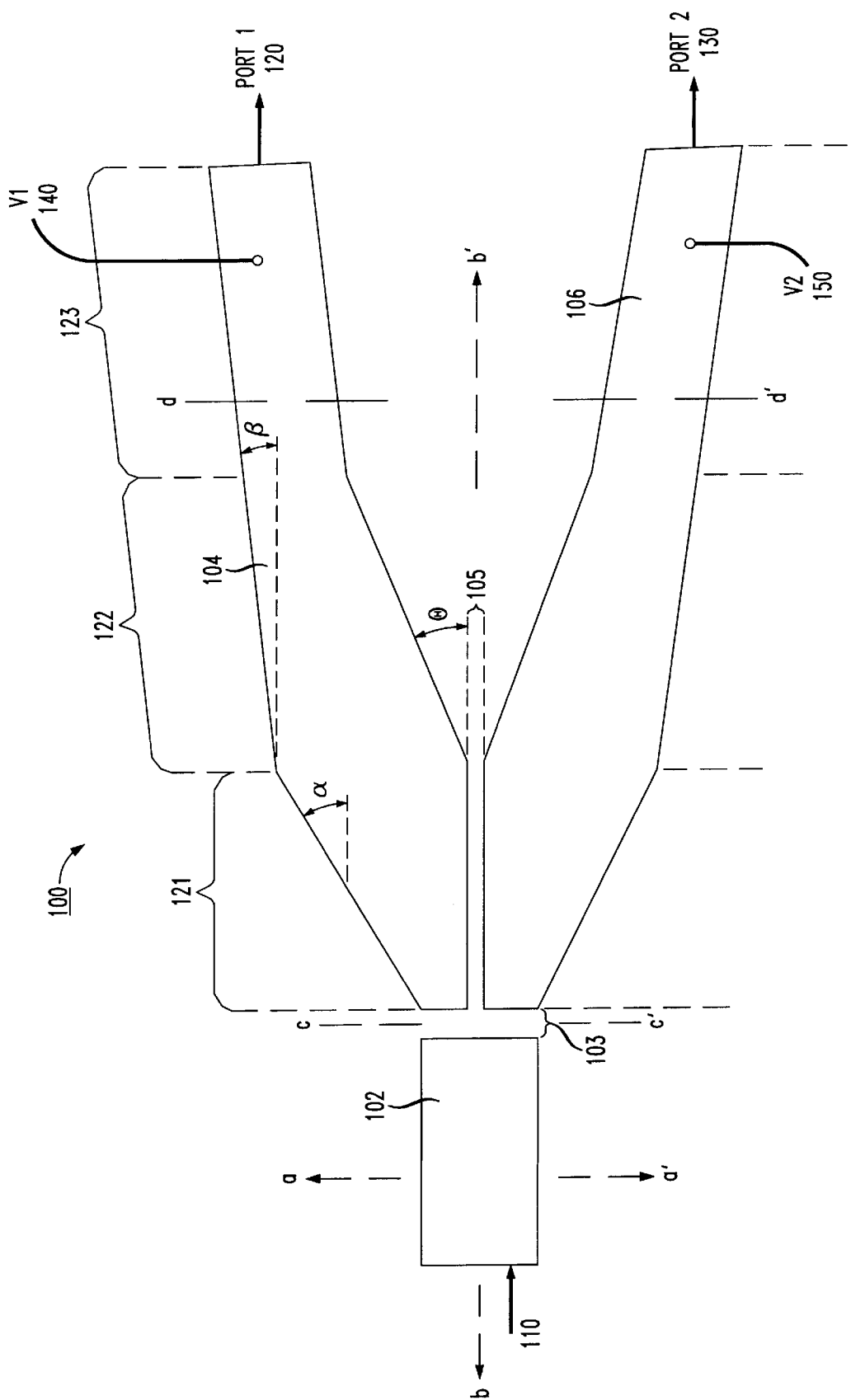
FIG. 1 is a top view of an illustrative adiabatic Y-branch optical waveguide in which the present invention may be practiced.

With reference to FIG. 1, there is shown a top view of an illustrative adiabatic Y-branch optical waveguide 100 that may be operated according to the principles disclosed herein to provide a controllable frequency chirp to a received optical signal. The waveguide structure of FIG. 1 is shown to include a first section 102 (also referred to as an input branch) and a second and third sections 104 and 106 (also referred to as a first and second output branches, respectively). The waveguide structure of FIG. 1 may be used as a controllable chirp optical signal splitter, a controllable chirp optical signal modulator, or a controllable chirp optical signal switch. The embodiment shown in FIG. 1 may be constructed using semiconductor material such as Indium Phosphide. However, note that this adiabatic Y-branch waveguide can be constructed using other materials selected from a group of materials including Group II–Vi, Group III–V and Group IV materials. Although FIG. 1 shows a tapered adiabatic Y-branch structure, this is for illustrative purposes only, it being understood that the principles of the invention are applicable to virtually any type of optical switching or modulator structure with physical dimensions and configurations other than those shown in FIG. 1, so long as these structures use adiabatic modal evolution. As shown, the structure of FIG. 1 is constructed for electrical isolation in doped semiconductor waveguides where physical waveguide separations must be provided, shown as gaps 103 and 105.

Figure 2A:
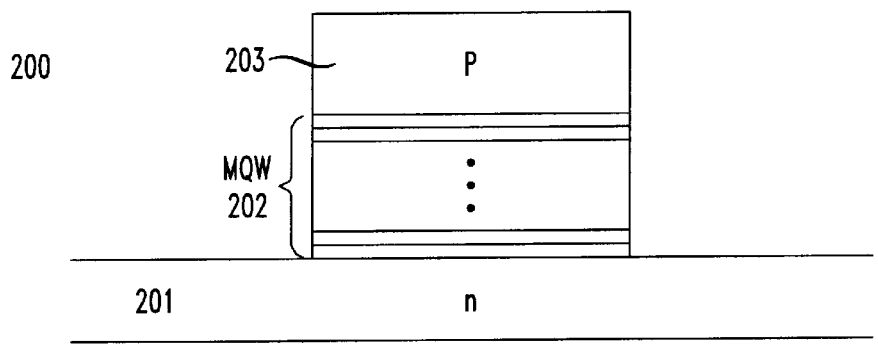
FIG. 2 shows an illustrative cross section of the illustrative adiabatic Y-branch optical waveguide of FIG. 1 constructed using doped semiconductor materials.
Figure 2B:
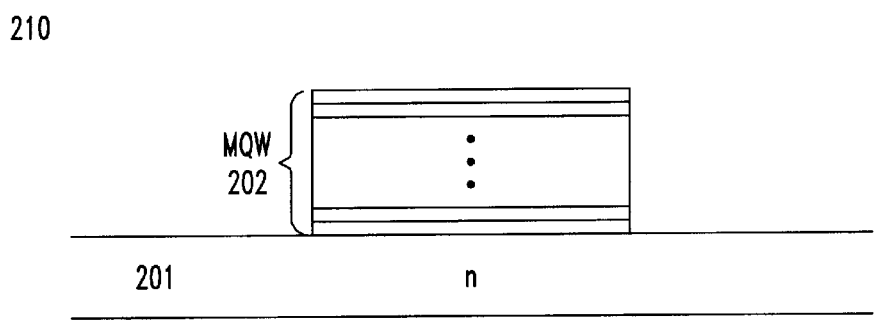
Figure 2C:
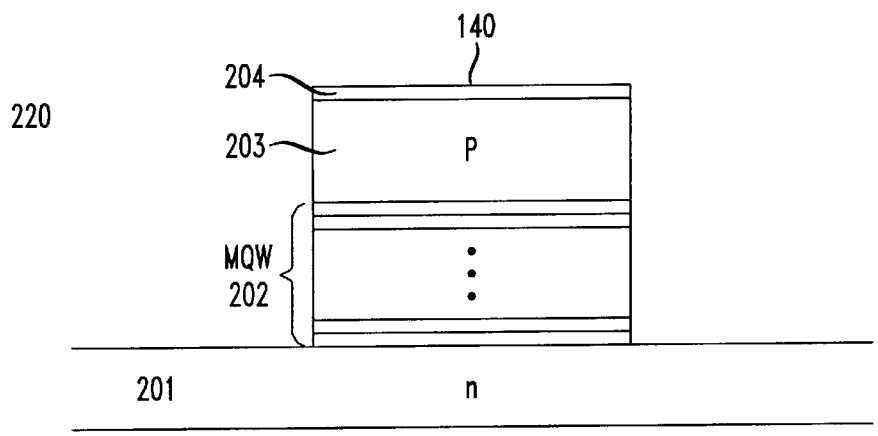

With reference to 200 of FIG. 2, there is shown an illustrative cross section of the waveguide section 102 along the axis a–a'. The illustrative adiabatic Y-branch optical waveguide of FIG. 1 is shown constructed using an n doped semiconductor material 201 onto which is epitaxially-grown a multiple layer quantum well region 202, and a p semiconductor material 203. As will be described more in later paragraphs, the multiple quantum well (MQW) region 202 may be formed in a standard manner using alternating layers of a variety of materials. Shown in 210 is an illustrative cross section of the waveguide section along the axis c–c' in the gap region 103. Note that isolation between the first section 102 and the second and third sections, 104 and 106, is achieved by not growing the p semiconductor in the gap region 103. Alternatively, the p semiconductor could be grown over the whole waveguide and etched away in gap region 103. Isolation is achieved in the same manner in the gap region 105 between the second and third sections 104 and 106. With reference to 220, there is shown an illustrative cross section of the waveguide sections or output branches 104 and 106 along the axis d–d'. As shown this cross section includes a suitable conductive cladding or contact material 204 through which the electrical signal 205 is applied to bias the active structure including p semiconductor region 203, MQW region 202, and n semiconductor region 201. A suitable electrical bias (or control) signal, e.g., 140, is applied to the first output waveguide section 104 to obtain a change in its index of refraction. In accordance with the present invention, a suitable electrical bias signal, e.g., 160, is applied to the second output waveguide section 106 to obtain a change in its index of refraction which is opposite to the change in the refractive index produced in the first output waveguide section 104. In this manner, these opposite changes made in the refractive index in waveguide sections 104 and 106 are used to control the desired amount of chirp in the optical signal outputted from one or both of the output branches 104 and 106 of the Y-branch optical waveguide 100.

The conductive cladding or contact material 204 may be deposited over the entire waveguide branches 104 and 106 (as shown in FIG. 1) or any part thereof. Note the contact material 204 may also be deposited over the p semiconductor layer 203 of waveguide branch 102, and remain unbiased. Since no bias potential is applied to the contact material 204 of waveguide section 102, it would not affect the refractive index of waveguide section 102.

Returning to FIG. 1, the Y-branch optical waveguide 100 is shown to include a first waveguide section (or branch) 102, a second waveguide section 104, and a third waveguide section 106. The first waveguide section 102 is fabricated to accept a single-mode optical input signal 110 which is adiabatically transformed to an output signal. e.g., 120 or 130. In the Y-branch optical waveguide 100, adiabatic modal evolution steers light to the output port 1 or 2 port (of waveguide sections 104 or 106) which has the higher refractive index. When the refractive index is changed in a waveguide section, e.g., 104 or 106, a chirp is introduced in any optical signal passing through that waveguide section. We have found that if the index in waveguide sections 104 and 106 is changed in opposite directions, in amounts which are controlled by an applied control signal, 140 and 150, respectively, a controlled change can be made in the chirp of the signal (120 or 130) outputted from Y-branch optical waveguide 100. In this manner, we can add or subtract a predetermined amount of chirp to the chirp characteristic of the input signal 110. Thus, the Y-branch optical waveguide 100 can be used to compensate for or cancel chirp introduced in the optical input signal 110 by prior optical fiber or circuits through which the signal has passed. The desired amount of chirp added to or subtracted from input signal 110 is controlled, in accordance with the present invention, by introducing controlled opposite amounts of refractive index changes in the second and third waveguide sections 104 and 106. The amount and sign of the refractive index changes in the second and third waveguide sections 104 and 106 is controlled by the electrical signals 140 and 150 which bias the MQW device (202 of FIG. 2) in their respective branches 104 and 106, thereby causing opposite refractive index and phase changes in these MQW devices. The resulting opposite refractive index and phase changes in branches 104 and 106 together produce the desired signal chirp. The electrical signals 140 and 150 required to produce the desired change in the chirp characteristics in the input signal 110 depends on the materials used to construct the Y-branch optical waveguide 100. If we assume that the Y-branch optical waveguide 100 is constructed using a p and n doped semiconductor material (203 and 201 of FIG. 2) with an intrinsic MQW region (202 of FIG. 2), refractive index changes on the order of $10^{-3}$ to $10^{-4}$ may be produced in the input signal (110 of FIG. 1) using electrical control signals (140 and 130 of FIG. 1).

In one embodiment of the Y-branch optical waveguide 100, the initial width of first waveguide section 102 along axis a–a', i.e., the end of first waveguide section 102 that is equipped to accept optical energy (an optical signal), may be approximately 3.0 micrometers. The other end of the first waveguide section 102 is placed in close physical proximity to an end of the second waveguide section 104. This end of first waveguide section 102 is also placed in close physical proximity to an end of the third waveguide section 106, thereby providing a gap 103 between the first waveguide section 102 and each of the second and third waveguide sections 104, 106. The second waveguide section 104 is placed in close proximity to the third waveguide section 106 such that there is a gap 105 of about 0.75 micrometers between the second and third waveguide sections 104, 106. Note that a physical gap, i.e., gap 103, must be provided to electrically isolate first waveguide section 102 from second and third waveguide sections 104, 106 where doped semiconductor materials are used.

Second and third waveguide sections 104, 106 are both tapered in a manner so as to provide first and second tapered sections 121, 122, as well as a substantially untapered section 123. The use of tapered sections provides a Y-branch optical waveguide 100 having a reduced length along axis b–b' relative to a similar Y-branch optical waveguide that does not use such tapered sections. This reduced length permits the Y-branch waveguide 100 to be used in system applications where it is important or desirable to provide devices having compact dimensions. In many, if not all, cases, the use of tapered sections provides a length reduction of significant magnitude. Although FIG. 1 shows the use of tapered sections for both output branches, this is for purposes of illustration, as it is also possible to use tapered sections for either one of the two output branches, and to not use tapered sections for the remaining output branch.

Together, the tapered and untapered sections of optical waveguide 100 form a first taper angle α, a second taper outer angle β, and a second taper inner angle θ. These taper angles α, β and θ, may be defined with reference to axes which are parallel to propagational axis b–b', where propagational axis b–b' defines the direction of propagation through the first waveguide section 102. The angles are measured between an axis parallel to axis b–b' and a sidewall of a waveguide section. Inner angles are angles on the sidewall of second waveguide section 104 closest to third waveguide section 106, and also angles on the sidewall of third waveguide section 106 closest to second waveguide section 104. Outer angles are angles on the sidewall of second waveguide section 104 that is furthest from third waveguide section 106, and also angles on the sidewall of third waveguide section 106 that are furthest from second waveguide section 104. In the example of FIG. 1, the first taper angle α is selected to be about 0.9 degrees, the second taper outer angle β is selected to be about 0.1 degrees, and the second taper inner angle θ is selected to be about 0.35 degrees. The length of the first tapered section 121 in a direction parallel to propagational axis b–b' is about 180 micrometers, the length of the second tapered section 122 in a direction parallel to propagational axis b–b' is about 200 micrometers, and the length of the untapered section 123 in a direction parallel to propagational axis b–b' is about 500 micrometers or more. The illustrative example of FIG. 1 is shown as being symmetrical about propagational axis b–b'. However, in accordance with the present invention, such symmetry is not required for obtaining the controlled chirp from an output waveguide branch 104 or 106.

First tapered section 121 of second waveguide section 104 is tapered such that the cross-sectional area of the waveguide increases with increased distance along a path defining the direction of optical propagation of the waveguide section. First tapered section 121 of third waveguide section 106 is also tapered such that the cross-sectional area of the waveguide increases with increased distance along a path defining the direction of optical propagation of the waveguide section. For purposes of characterizing waveguide taper, the cross sectional areas of the second and third waveguide sections 104, 106 may be taken along a plurality of planes that are substantially perpendicular to the direction of optical propagation. In this manner, as an optical beam traverses the first tapered section 121 of second waveguide section 104, the beam may be conceptualized as being dispersed over an ever-increasing area. Similarly, an optical beam traversing the first tapered section 121 of the third waveguide section 106 may be conceptualized as being dispersed over an ever-increasing area. In the example of FIG. 1, the first tapered section 121 of the second waveguide section 104 and the first tapered section 121 of the third waveguide section 106 are shown as symmetric for illustrative purposes only. Symmetric structures may, but need not, be used for the first tapered sections 121 of the second and third waveguide sections 104, 106. The first tapered sections 121 of the second and third waveguide sections 104, 106 may be conceptualized as representing a first, optically diverging, region of Y-branch optical waveguide 100.

Second tapered section 122 of second waveguide section 104 is tapered such that the cross-sectional area of the waveguide decreases with increased distance along a path defining the direction of optical propagation of the waveguide section. Second tapered section 122 of third waveguide section 106 is also tapered such that the cross-sectional area of the waveguide decreases with increased distance along a path defining the direction of optical propagation of the waveguide section. The cross sectional areas of the second and third waveguide sections 104, 106 may be taken along a plurality of planes that are substantially perpendicular to the direction of optical propagation. In this manner, as an optical beam traverses the second tapered section 122 of second waveguide section 104, the beam will converge into an ever-decreasing area. Similarly, an optical beam traversing the second tapered section 122 of the third waveguide section 106 will be converged into an ever-decreasing area. In the example of FIG. 1, the second tapered section 122 of the second waveguide section 104 and the second tapered section 122 of the third waveguide section 106 are shown as symmetric for illustrative purposes only. Symmetric structures may, but need not, be used for the second tapered sections 122 of the second and third waveguide sections 104, 106. The second tapered sections 122 of the second and third waveguide sections 104, 106 may be conceptualized as representing a second, optically converging, region of Y-branch optical waveguide 100.

Untapered section 123 of second waveguide section 104 is configured such that the cross-sectional area of the waveguide remains substantially unchanged with increased distance along a path defining the direction of optical propagation of the waveguide section. Untapered section 123 of third waveguide section 106 is also configured such that the cross-sectional area of the waveguide remains substantially the same with increased distance along a path defining the direction of optical propagation of the waveguide section. The cross sectional areas of the second and third waveguide sections 104, 106 may be taken along a plurality of planes that are substantially perpendicular to the direction of optical propagation. In this manner, as an optical beam traverses the untapered section 123 of second waveguide section 104, the beam will neither substantially converge into an ever-decreasing area, nor substantially diverge into an ever-increasing area. Similarly, an optical beam traversing the untapered section 123 of the third waveguide section 106 will neither substantially converge into an ever-decreasing area, nor substantially diverge into an ever-increasing area. In the example of FIG. 1, the untapered section 123 of the second waveguide section 104 and the untapered section 123 of the third waveguide section 106 are shown as symmetric for illustrative purposes only. Symmetric structures may, but need not, be used for the untapered sections 123 of the second and third waveguide sections 104, 106. The untapered sections 123 of the second and third waveguide sections 104, 106 may be conceptualized as representing a third region of Y-branch optical waveguide 100.

The physical configuration of Y-branch optical waveguide 100 represents a significant improvement, in terms of excess loss, extinction ratio, and shorter length, over prior art designs. Due to the fact that the Y-branch optical structure of FIG. 1 utilizes principles of adiabatic modal evolution, existing Y-branch waveguides are undesirably lengthy as measured along propagational axis b–b'. This length was required in order to maintain a relatively small angle (less than about 0.1 degree) between the first waveguide section 102 and each of the second and third waveguide sections 104, 106 in order to maintain adiabatic modal evolution. This small angle provides a structure having low loss and low crosstalk which increases the extinction ratio of the Y-branch waveguide 100. Such crosstalk occurs between the second and third waveguide sections 104, 106. The first, second, and third tapered sections 121, 122, 123 of Y-branch waveguide 100 are adiabatically tapered and provide a vastly improved structure which need only be about 800 micrometers long to provide adequate crosstalk and minimal attenuation.

The first, second, and third waveguide sections 102, 104, 106 may be fabricated using an 0.6-micrometer active layer of InGaAsP (Indium Gallium Arsenide Phosphide), clad with an 1.0 -micrometer layer of InP (Indium Phosphide) cladding. The etch depth may be approximately 1.2 micrometers; however, physical dimensions other than those described also fall within the scope of the invention. The use of the aforementioned materials provides an Y-branch waveguide which can operate as a modulator at speeds of up to 20 Gb/second, because of the relatively short length of the device and the relatively high index change that can be achieved with moderate modulating voltage/current levels. Generally, higher modulation rates are obtained when the control signals are voltages as opposed to currents.

It is understood that, while the material system of InGaAsP/InP is described above for fabricating an Y-branch waveguide 100, other material combinations may be selected from other semiconductor Group III–V materials such as GaAs/AlGaAs, InGaAs/InAlAs, GaAs/AlAs, GaAsSb/GaAlAsSb, and GaAs/InGa AlAs. In these semiconductor systems, the layers may be lattice-matched to suitable GaAs or InP substrates. Mismatching is also contemplated wherein strained layers are grown over the substrate material. Finally, extension of the device structures is also contemplated to semiconductor compounds in Group II–VI and Group IV.

As previously noted, the operation of Y-branch waveguide 100 is governed by the principle of adiabatic modal evolution. Optical signals 110 to which modulation is to be applied is fed into first waveguide section 102. The waveguide modulator 100 has an "on" state and an "off" state. To achieve the optical "on" state, this optical energy is adiabatically directed to a modulator output port, for example, waveguide section 104 by lowering the refractive index in waveguide section 106 (using a suitable modulating signal 150 applied to section 106). Note to insure the desired controlled chirp value during this "on" state, the combined modulating and bias voltage on waveguide sections 104 and 106 have to equal the bias voltages necessary to obtain the desired chirp value. To achieve the optical "off" state, the refractive index in waveguide section 106 is raised until the optical energy is coupled from waveguide sections 102 and 104 into waveguide section 106. However, the refractive index in waveguide section 104 is not modified.

First waveguide section 102 is configured to support a fundamental mode of electromagnetic wave propagation. Second and third waveguide sections 104, 106 are also configured so as to support a fundamental mode of propagation. If the second and third waveguide sections 104, 106 are so configured, the propagating mode of the optical signal in first waveguide section 102 adiabatically evolves to the fundamental mode of the second and third waveguide sections 104, 106. The optical field distribution of the fundamental mode as the mode propagates in the second and third waveguide sections 104, 106 depends upon the refractive index variation of these waveguide sections. By increasing the refractive index of one of these waveguide sections (e.g., second waveguide section 104) with respect to the other waveguide section (e.g., third waveguide section 106), an optical signal from first waveguide section 102 can be almost completely guided into the second waveguide section 104. Similarly, by decreasing the refractive index of one of these waveguide sections (e.g., second waveguide section 104) with respect to the other waveguide section (e.g., waveguide section 106), an optical signal from the first waveguide section can be almost completely guided into the other waveguide section, i.e., third waveguide section 106.

Various techniques can be used to change the refractive index of only one waveguide section. For example, the refractive index of one of the waveguide sections can be changed by applying some type of force to the waveguide, such as a mechanical force, a chemical force, and/or an electrical force. Examples of electrical forces are current and/or voltage. In cases where semiconductor materials such as, for example, InGaAsP and InP, are employed to fabricate the waveguide sections of FIG. 1, a convenient technique for changing the refractive index of a waveguide section is by applying and/or changing a bias voltage and/or current applied to that waveguide section. However, the principles of the invention disclosed herein are applicable to all adiabatic optical modulators, irrespective of the type of force that is used to change the refractive index of a waveguide section.

The Y-branch digital optical modulator shown in FIG. 1 and operated according to the principles of the invention disclosed herein may advantageously be employed in the operational environment of wavelength-division-multiplexed (WDM) systems. WDM systems represent an area within optical communications that has gained enormous interest in recent times. WDM systems utilize a plurality of modulated signals which are transmitted over the same optical fiber using different optical frequencies (or wavelengths). Prior-art WDM systems use different lasers as optical sources at different optical frequencies. These lasers are individually modulated and then combined into one fiber. When operated in accordance with the principles of the present invention, the configuration of FIG. 1 can be used to provide a wavelength-insensitive and controllable chirp modulator for many lasers of different frequencies. Such a modulator may be integrated with all of the lasers or, alternatively, could be a stand-alone modulator to simplify the manufacturing process.

One existing approach to minimizing the frequency chirp of a semiconductor laser uses a continuous-wave laser and an external modulator. One implementation of this approach uses a semiconductor laser and an external $LiNbO_3$ Mach-Zehnder modulator. This approach is somewhat expensive, and the resulting laser/modulator occupies an area that is undesirably large for certain system applications. Although this approach is currently used for very long distances, i.e., long-haul transoceanic systems, many long-haul terrestrial systems currently use semiconductor lasers that are monolithically integrated with external semiconductor modulators. These integrated devices exhibit an undesirable amount of chirp, and therefore, the application of these devices are limited to shorter distances compared to the "discrete" laser modulator configuration used, for example, in transoceanic systems. Furthermore, the current integrated laser-modulator device uses a semiconductor electro-absorption modulator that inherently exhibits an undesirable amount of frequency chirp. The chirp in this type of modulator is caused by the refractive index change that is induced when the modulator is biased with an external voltage for modulating the optical signal going through it.

The Y-branch waveguide of FIG. 1 with its three tapered sections can be advantageously employed as a laser modulator that provides a controllable amount of frequency chirp, occupies a relatively small amount of space, and may be relatively inexpensive to manufacture. To this end, note that presently-existing external modulators that are used in long-haul systems are fabricated using LiNbO$_3$ material. These prior art designs utilize a Mach-Zehnder configuration which is expensive and presents difficult size requirements for certain system applications. However, until now, use of the Mach-Zehnder configuration has been virtually mandated where zero chirp, or controllable chirp, needed to be provided in very long-haul communications. The modulator of FIG. 1 can be used in place of such Mach-Zehnder devices.

Figure 3:
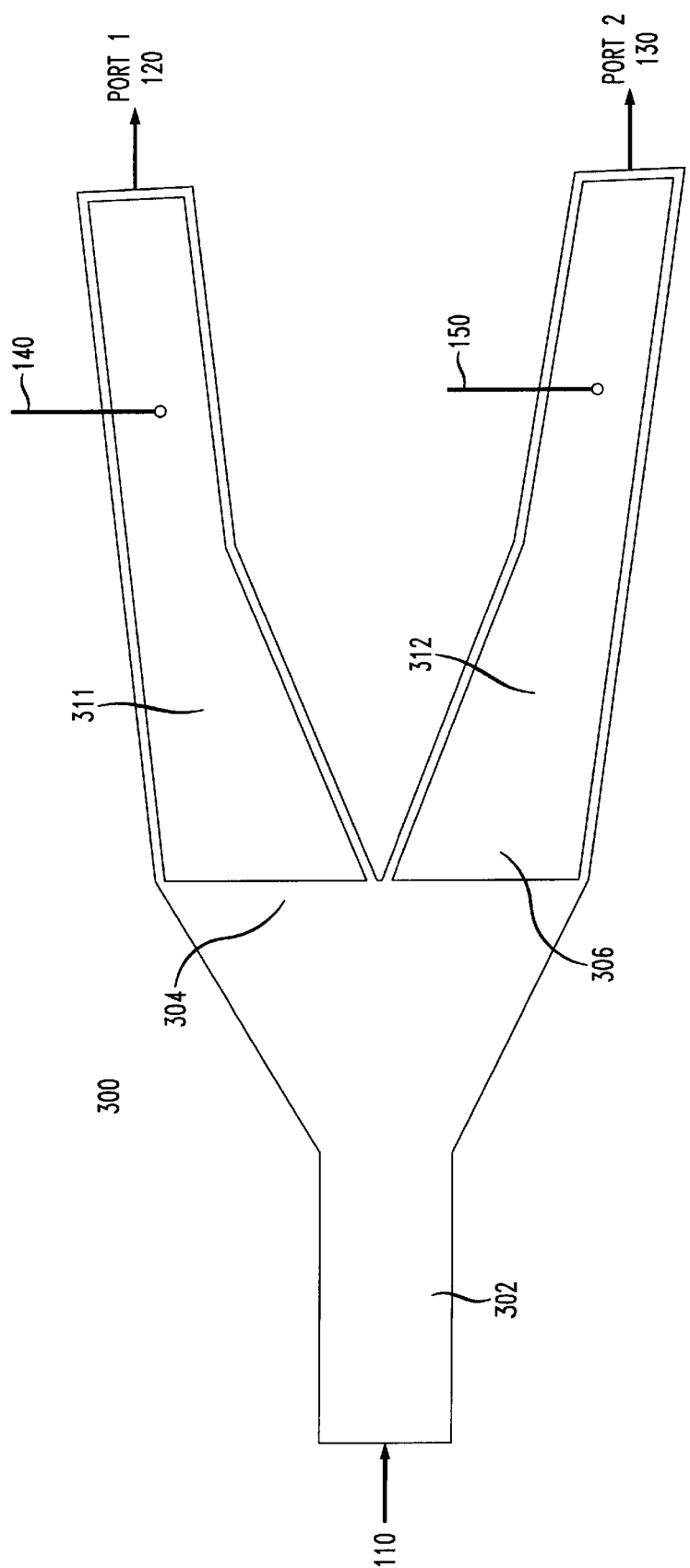
FIG. 3 shows an illustrative adiabatic Y-branch optical waveguide of FIG. 1 constructed using an insulator material.

With reference to FIG. 3, there is shown another embodiment of the invention where the Y-branch waveguide 300 is fabricated using LiNbO$_3$ material. Since LiNbO$_3$ is an insulator, there is no need to have any gaps (103 and 105 of FIG. 1) between the waveguide sections 302, 304 and 306. Thus, all the sections 302, 304, and 306 all have same cross section, except for the contact regions 311 and 312. The contact area 311 and 312 are used to apply the electrical control signals 140 and 150 to the branches 304 and 306, respectively. Again the size of contact areas 311 and 312 are illustrative only and can be made smaller or as large as the regions 304 and 306, shown in FIG. 3.

Figure 4:
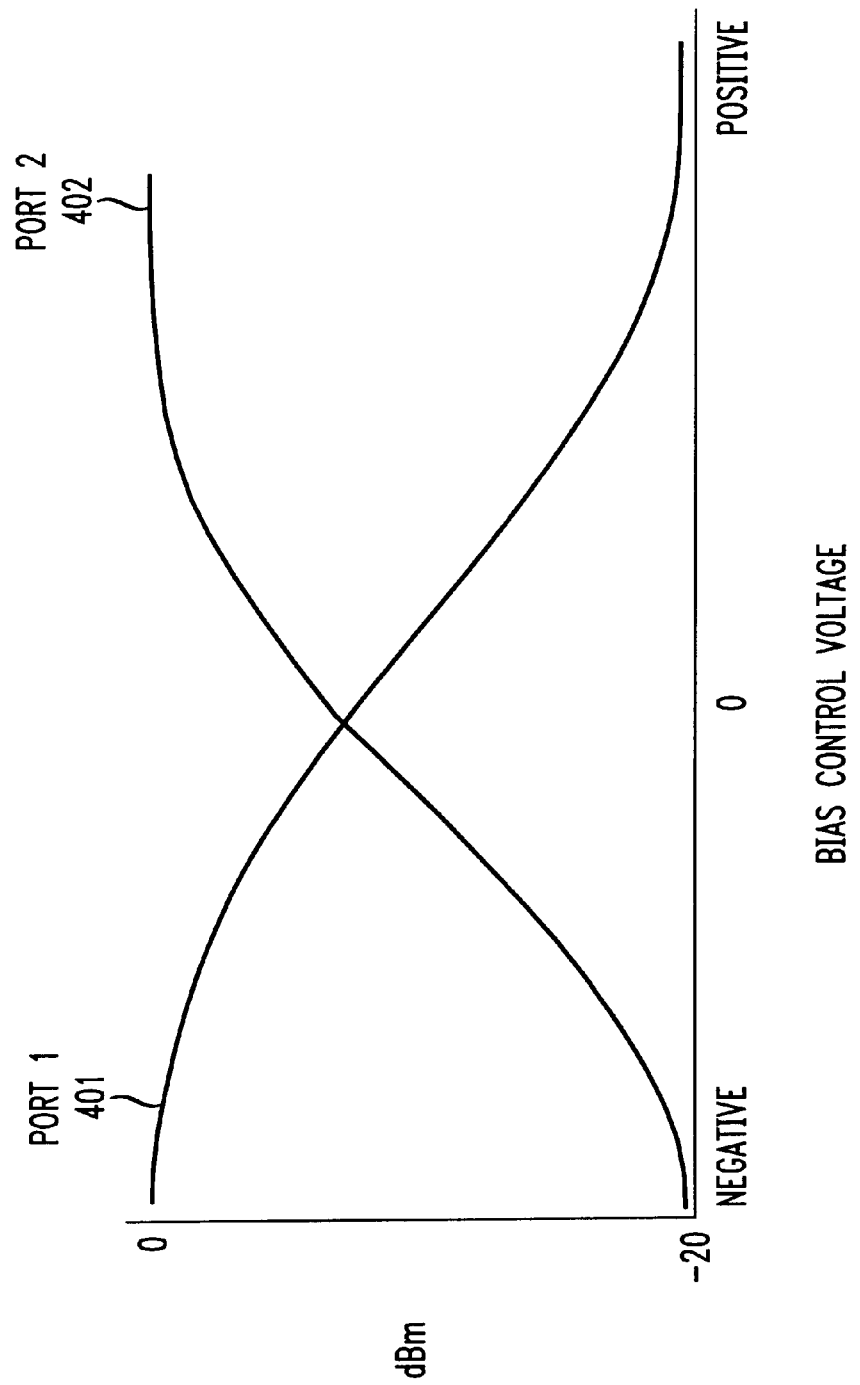
FIG. 4 is a graph of applied control voltage versus output power for the Y-branch optical waveguide modulator of FIG. 1.

Shown in FIG. 4 is a graph of the output power versus bias voltage for a Y-branch waveguide 100 (FIG. 1) constructed using semiconductor material. This figure shows how the optical output power of the second waveguide section 104 (port 1) and third waveguide section 106 (port 2) varies with bias voltages V1 and V2 applied, respectively, to the second and third waveguide sections 104, 106. Output power is shown along the vertical axis in dBms and applied voltages are shown (negative and positive) along the horizontal axis. Output power of port 1 is shown as curve 401, and output power of the port 2 is shown as curve 402. Note that when no bias voltage is applied to either waveguide section 104, 106, as is the case at the center of the graph, the output power at ports 1 and 2 are both 3 dB down from the input power fed to the first waveguide (input) section 102. Under these conditions of bias, the Y-branch waveguide 100 (FIG. 1) functions as a power splitter, dividing optical energy fed into first waveguide section 102 substantially equally among the output ports 1 and 2.

As the bias voltage V1 applied to the second waveguide section 104 is made more negative it increases the refractive index of waveguide section 104, and increases the power fed into the second waveguide section 104 while decreasing the power to the third waveguide section 106. Conversely, as the bias voltage V2 applied to the third waveguide section 106 is made more positive it decreases the refractive index of the third waveguide section 106 and increases the power fed into the second waveguide section 104. Thus, applying a negative bias voltage to the second waveguide section 104 produces the same general power distribution effect as applying a positive bias voltage to the third waveguide section 106. As shown on the left side of FIG. 2, 403, the power output at port 1 is 0 dBm (curve 401) and the power output at port 2 is negligible, about −20 dBm, (curve 402) for a certain negative bias voltage V1 and positive bias voltage V2. As shown on the right side of FIG. 2, 404, the power output at port 2 is 0 dBm (curve 402) and the power output at port 1 is negligible, about 20 dBm, (curve 401) for a certain positive bias voltage V1 and negative bias voltage V2. When Y-branch waveguide 100 is used as a modulator with port 1 as the output port the bias condition 403 (negative V1 and positive V2) is the "on" state of the modulator and the bias condition 404 (positive V1 and negative V2) is the "off" state of the modulator. Conversely, when Y-branch waveguide 100 is used as a modulator with port 2 as the output port the bias condition 404 (positive V1 and negative V2) is the "on" state of the modulator and the bias condition 404 (negative V1 and positive V2) is the "off" state of the modulator. The ratio of power between the "on" and "off" state of the modulator is called the extinction ratio (about 20 dB in our example of FIG. 4). This extinction ratio is determined by the relative amount of refractive index change between the second and third waveguide sections 104, 106.

It should be noted that both the sign and magnitude of changes in refractive index depends on the material that is used to construct the Y-branch waveguide. As noted with semiconductor materials, discussed above, the index of a branch increases with a decreasing bias voltage applied to that branch and vice-versa. For other types of materials (e.g., insulators) if the index of a branch increases with a increasing bias voltage applied to that branch and vice-versa.

In accordance with the present invention, the amount of chirp in the output signal appearing at an output port of Y-branch waveguide 100 can be controlled by appropriately selecting the voltages V1 and V2. When the Y-branch waveguide 100 is used as a modulator, the "on" state voltages V1 and V2 will be those required to produce the desired chirp characteristics of the modulator. For example, for a Y-branch waveguide constructed using a semiconductor material, if the output port is to be port 1 then the voltage V1 should be negative and the voltage V2 should be positive, the magnitudes of V1 and V2 being determined by the desired chirp characteristics of the output signal.

As an example, consider a semiconductor quantum well structure implemented using a Barrier Reservoir Quantum Well Electron Transfer (BRAQWET) layer which provides index changes both in positive and negative directions when negative and positive voltages are applied, respectively, in the two waveguides of the Y-branch modulator. A positive voltage applied to the BRAQWET waveguide decreases the index due to the bandfilling effect and a negative voltage increases the index via the Stark effect. This allows the total chirp of the modulator (can be taken from either output port) to be controlled due to the phase controlling or tuning of the output light from positive and negative index changes in the two ports. Phase change, $\Delta\phi$, is related to index change, $\Delta n$, according to the following:

$$\Delta\Phi = (2\pi\Delta n/\lambda)L, \tag{1}$$

where $\lambda$ and L are operating wavelength and Y-branch electrode length respectively. Hence both positive and negative phase changes can be achieved in the Y-branch modulator from the positive and negative index changes.

Chirp parameter a is related to the time varying phase change according to the following:

$$\alpha = (d\phi/dt)/(1/E)(dE/dt), \tag{2}$$

where $\phi$ and E are the phase and amplitude of the optical field.

Since both positive and negative phase changes can be obtained in this Y-branch modulator structure, the chirp quantity given by equation (2) can also have positive and negative values on either output port. Since the waveguide optical fields are coupled in the two branches near the Y-junction, the total chirp in one branch can be tuned by the interaction of the two phase changes in opposite direction in the two waveguide branches. Hence, if a certain chirp value is desired from the Y-branch modulator (output taken from one port), voltages can be applied to the branch associated with the modulator output to coarsely set the chirp value and another voltage can be applied to the other branch to fine tune the chirp of the modulator port.

This controllabie-chirp Y-branch modulator can also be constructed in insulators such as LiNbO3 or other material as long as refractive index changes in the two ports can increase and decrease due to applied voltages or other methods, i.e. mechanical forces, thermal forces, electrostriction forces, etc.

What has been described is merely illustrative of the application of the principles of the present invention. Hence, other arrangements can be implemented by those skilled in the art without departing from the spirit and scope of the present invention.

We claim:

1. An adiabatic Y-branch optical waveguide comprising an input branch for receiving an optical signal, a first output branch and a second output branch;

first index changing means for changing a refractive index of only the first output branch of the waveguide in response to a first electrical signal;

second index changing means for changing a refractive index of only the second output branch of the waveguide in an opposite direction to the change of refractive index of the first output branch in response to a second electrical signal, the second electrical signal being independent of the first electrical signal; and wherein the first and second electrical signals are controlled to produce a desired amount of chirp in the optical signal outputted from one of the output branches.

2. The Y-branch waveguide of claim 1 being a modulator and the first and second signals being modulating signals for producing a modulated optical output signal.

3. The Y-branch waveguide of claim 1 wherein the first output branch and the second output branch are each comprised of tapered waveguide sections.

4. The Y-branch waveguide of claim 1 wherein at least one of the first output branch and the second output branch are comprised of one or more tapered waveguide sections.

5. The Y-branch waveguide of claim 1 wherein at least one of the first output branch and the second output branch includes an untapered section having a cross-sectional area that remains substantially constant with increased distance along the longitudinal axis of the respective output branch.

6. The Y-branch waveguide of claim 1 wherein the input branch, the first output branch, and the second output branch are fabricated using compounds selected from one of group of materials including a Group II–VI, a Group III–V and a Group IV material system.

7. The Y-branch waveguide of claim 6 wherein the first output branch and the second output branch are fabricated to include a multiple quantum well (MQW) for controlling a refractive index of the first and second output branches.

8. The Y-branch waveguide of claim 1 wherein the input branch, the first output branch, and the second output branch are fabricated using insulator electro-optic or thermo-optic materials.

9. The Y-branch waveguide of claim 1 wherein the input branch, the first output branch, and the second output branch are fabricated using lithium niobate (LiNbO₃).

10. The Y-branch waveguide of claim 1 wherein the input branch, the first output branch, and the second output branch are fabricated using GaAsInP semiconducting material.

11. The Y-branch waveguide of claim 10 wherein a cladding layer of InP is applied to the GaAsInP semiconducting material.

12. The Y-branch waveguide of claim 1 wherein when the optical signal is outputted from the first output branch, the first electrical signal provides a coarse adjustment to the chirp in said outputted optical signal and the second electrical signal provides a fine adjustment to the chirp in said outputted optical signal.

13. A method of operating an adiabatic Y-branch optical waveguide comprising the steps of (a) applying an input optical signal to an input branch of the waveguide;

(b) changing a refractive index of only a first output branch of the waveguide in response to a first electrical signal;

(c) changing a refractive index of only a second output branch in an opposite direction to the change of refractive index of the first output branch in response to a second electrical signal, the second electrical signal being independent of the first electrical signal; and (d) controlling the first and second electrical signals to adjust a chirp in the optical signal outputted from one of the output branches.

14. The method of claim 13 wherein the first and second signals are modulating signals for producing a modulated optical output signal.

15. The method of claim 13 further comprising the steps of configuring the first output branch and the second output branch to each include a tapered section having a cross-sectional area that decreases with increased distance along a longitudinal axis of the respective output branch.

16. The method of claim 13 further comprising the steps configuring the first output branch and the second output branch to each include an untapered section having a cross-sectional area that remains substantially constant with increased distance along a longitudinal axis of the respective output branch.

17. The method of claim 13 further including the step of configuring the first output branch and the second output branch to be substantially symmetric about a propagational axis of the input branch.

18. The method of claim 13 further including the steps of fabricating the input branch, the first output branch, and the second output branch using compounds selected from one of group of materials including a Group II–VI, a Group III–V and a Group IV material system.

19. The method of claim 13 further including the steps of fabricating the first output branch and the second output branch to each include a multiple quantum well (MQW) for controlling a refractive index of that branch in response to an electrical signal.

20. The method of claim 19 further including the step of applying a cladding layer of InP to the GaAsinP semiconducting material.

21. The method of claim 13 further including the step of fabricating the input branch, the first output branch, and the second output branch using lithium niobate (LiNbO₃).

22. The method of claim 13 further including the step of fabricating the input branch, the first output branch, and the second output branch using GaAsInP semiconducting material.

23. The method of claim 13 wherein when the optical signal is outputted from the first output branch, the first electrical signal provides a coarse adjustment to the chirp in said outputted optical signal and the second electrical signal provides a fine adjustment to the chirp in said outputted optical signal.

* * * * *